United States Patent [19]

Spokoyny et al.

[11] Patent Number: 5,323,842
[45] Date of Patent: Jun. 28, 1994

[54] TEMPERATURE-STABILIZED HEAT EXCHANGER

[75] Inventors: Felix E. Spokoyny, Costa Mesa; Henry V. Krigmont, Seal Beach; Wayne R. Kozacka, Laguna Hills, all of Calif.

[73] Assignee: Wahlco Environmental Systems, Inc., Santa Ana, Calif.

[21] Appl. No.: 894,438

[22] Filed: Jun. 5, 1992

[51] Int. Cl.$^5$ .............................................. F23D 19/04
[52] U.S. Cl. .......................................... 165/7; 165/8; 165/10; 422/206; 422/222
[58] Field of Search ............................. 165/10, 8, 4, 7; 422/175, 206, 222

[56] References Cited

U.S. PATENT DOCUMENTS

| | | | |
|---|---|---|---|
| 4,351,806 | 9/1982 | Galloway | 422/206 |
| 4,602,673 | 7/1986 | Michelfelder et al. | 165/7 |
| 5,086,831 | 2/1992 | Paihert et al. | 422/206 |

FOREIGN PATENT DOCUMENTS

| | | | |
|---|---|---|---|
| 1170260 | 7/1985 | U.S.S.R. | 165/10 |
| 2086032 | 5/1982 | United Kingdom | 165/10 |

OTHER PUBLICATIONS

J. Schroder, "Thermal Energy Storage and Control," Trans ASME, J. Eng. for Industry, pp. 893-896 (1975).

W. Rohsenow et al., "Handbook of Heat Transfer Applications", pp. 8-5 and 8-31 to 8-39 (1985).

John J. Tomlinson et al., "Thermal Energy Storage", Mechanical Engineering, pp. 68-72 (1990).

Primary Examiner—Albert W. Davis, Jr.
Attorney, Agent, or Firm—Howard E. Sandler

[57] ABSTRACT

A heat exchange module comprises a rotating-wheel type regenerative heat exchanger unit having a plurality of heat exchange elements mounted in baskets through the volume of the heat exchanger wheel. The heat exchanger wheel rotates about its axis so that the heat exchange elements are heated by a hot gas flow over a portion of the rotation, and transfer the heat to an air flow over another portion of the rotation. At least some of the heat exchange elements include phase change materials, such as salts, that absorb heat while maintaining a constant temperature. The phase change materials narrow the range of temperatures reached by the heat exchange elements located at various positions of the heat exchanger wheel. The phase change materials prevent excessively low temperatures that can result in condensation of corrosive acids on the surfaces of the heat exchange elements. They can also stabilize the heat exchange elements in particularly desirable temperature ranges for the operation of catalysts coated onto the heat exchange elements.

21 Claims, 3 Drawing Sheets

TEMPERATURE-STABILIZED HEAT EXCHANGER

BACKGROUND OF THE INVENTION

This invention relates to heat exchangers such as those used in power plants, and, more particularly, to reduction of temperature extremes experienced in rotating-wheel heat exchangers.

In most fossil-fuel fired power plants, the incoming air used in combustion of the fuel is preheated prior to its reaching the burner or combustor. The preheating is accomplished by transferring heat from the hot combustion gas leaving the burner to the cool incoming air entering the burner. The heat transfer has the dual benefits of reducing the fuel consumption of the power plant and also reducing the temperature of the combustion gas so that it may be further treated, as in an electrostatic precipitator, and then exhausted to the atmosphere.

A regenerative rotating-wheel type heat exchanger, also known as a L'jungstrom heat exchanger, is often used to accomplish the heat transfer from a continuous flow of the hot combustion gas to a continuous flow of the cool air. The heat exchanger is formed as a large wheel, often 30 feet or more in diameter, that rotates about its cylindrical axis. Large numbers of heat exchange elements, often provided as thin metal plates to optimize heat transfer, are held in baskets within the heat exchanger wheel. A fixed hot gas plenum passes hot combustion (flue) gas through one portion of the heat exchanger wheel and its heat exchange elements, and simultaneously a fixed cool gas plenum passes cool incoming air through another portion of the heat exchanger wheel and its heat exchange elements. Appropriate controls and seals are provided to regulate the flow of the gases.

The hot gas flow heats the heat exchange elements over which it passes. The rotation of the wheel moves these heated elements to the region through which the cool gas passes, and the cool gas is heated by passing over the heated elements. The rotation of the wheel continues, moving the cooled elements back into the heating zone. The process is continuous, removing heat from the combustion gas and transferring it to the incoming air. The configuration of the wheel and the heat exchange elements, and the rate of rotation of the wheel, are optimized to achieve a maximum heat transfer efficiency.

The wide variations in temperature experienced by the heat exchange elements can create problems in several ways. When the cold end heat exchange elements move back into the hot combustion gas stream, the sulfur-laden combustion gas may condense as sulfuric acid onto the heat exchange elements, causing them to corrode. The elements over which the cool air first passes (the "cold end" elements) are cooled to the lowest temperatures of any of the heat exchange elements, and are therefore the most prone to this problem. The hot end heat exchange elements that always operate at higher temperatures may be coated with catalysts to accelerate specific chemical reactions that reduce the concentration of pollutants in the combustion gas. These catalysts are operable only in certain temperature ranges characteristic of the catalyst materials. Excessive temperature variations during the cycles of rotation may prevent the catalysts from functioning efficiently.

Thus, while rotating wheel and other types of continuous regenerative heat exchangers are widely used, both in power plants and in many other industrial plants and operations, their performance in many cases is limited by the temperature variations of the heat exchange elements. There is a need for an approach to improving the performance of the heat exchangers, such as rotating wheel heat exchangers. The present invention fulfills this need, and further provides related advantages.

SUMMARY OF THE INVENTION

The present invention provides an improved heat exchanger in which the temperature of the heat exchange elements is stabilized, so that the heat exchange elements do not experience as wide a range of temperature variations as would otherwise be the case. The stabilization of the temperature of the heat exchange elements aids in avoiding condensation of corrosive acid onto the cold end heat exchange elements and permits the hot end heat exchange elements to be maintained within preferred operating limits for catalysts. The stabilization is accomplished in a passive manner, by selecting particular materials for use in the heat exchange elements, rather than using an active mechanism and control method which would require sensors, the control means, and a control mechanism. The temperature stabilization approach is therefore reliable and not prone to breakdowns.

The present invention is applied to a heat exchange module wherein a plurality of such modules are positioned in a known manner in a rotary regenerative heat exchanger. In accordance with the invention, the modules have a plurality of heat exchange elements therein. At least some of the elements include encapsulated hollow sections carried adjacent respective surfaces thereof. The sections are each filled with a suitable phase change material which absorbs and releases heat from the fluid passing through such a regenerative heat exchanger, without a substantial change in temperature during the phase change of the material.

The heat exchanger has heat exchanger elements that transfer heat from a hot fluid flow to a cool fluid flow in a rotary heat exchanger. The two fluid flows are preferably parallel to each other and flow in the same direction (co-current flow) or opposite directions (counter-current flow). At least some of the heat exchange elements include means for absorbing heat while maintaining a constant temperature. A mechanical drive continuously moves the heat exchange elements relative to the two fluid flows, from contact with the hot fluid flow to contact with the cool fluid flow and back to contact with the hot fluid flow.

A key to the present invention is the use, in conjunction with the heat exchange elements, of a material that absorbs heat during heating while maintaining a constant temperature (and, conversely, also gives up heat during cooling while maintaining a constant temperature). The absorption or release of heat at constant temperature reduces the extremes of temperature through which the heat exchange element ranges during heating and cooling. In most instances, there will be some temperature change of the heat exchange element, even with the use of the material which absorbs heat without changing temperature, when the amount of heat to be absorbed exceeds the constant-temperature heat absorption capacity of the material. However, such temperature change will be smaller than in the absence of the constant-temperature heat absorbing material.

A preferred material which absorbs heat while maintaining constant temperature is a phase change material (PCM). When materials change their phase (e.g., from solid to liquid, or from liquid to gas), the phase change occurs at constant temperature with heat being absorbed (upon heating) or released (upon cooling). The heat absorbed at constant temperature during a solid-to-liquid phase change (often termed fusion or melting) is called the heat of fusion, and the heat absorbed at constant temperature during a liquid-to-gas phase change (often termed vaporization) is called the heat of vaporization.

A variety of phase change materials can be used in conjunction with the present invention, such as organic materials, inorganic materials, eutectic composition mixtures, eutectic fluoride mixtures, salt hydrates, and mixtures thereof. The preferred materials are inorganic salts (including eutectic matures of inorganic salts). Various inorganic salts (or eutectic mixtures of salts) absorb heat at a constant fusion temperature as they are heated and release heat at about that same fusion temperature as they are cooled. Non-eutectic mixtures of salts may also be used, but are not preferred. A number of salts are available and may be selected to provide constant-temperature heat absorption at the desired temperatures. The use of the phase change during fusion (melting) is preferred to that of the phase change in vaporization, inasmuch as there is usually a small volume change during fusion but a much larger volume change upon vaporization. Vaporization phase change materials are also more difficult to load into containers than are fusion phase change materials.

The present invention provides an important advance in the art of regenerative heat exchangers, such as the rotating wheel type. The heat exchanger operates in the normal fashion, but the extremes of temperature experienced by the heat exchange elements are narrowed. It is therefore usually possible to avoid a temperature reduction to below the acid condensation temperature and to maintain elements coated with catalysts within the operating range more easily. Other features and advantages of the invention will be apparent from the following more detailed description of the preferred embodiments, taken in conjunction with the accompanying drawings, which illustrate, by way of example, the principles of the invention.

DETAILED DESCRIPTION OF THE PREFERRED EMBODIMENT

Figure 1:
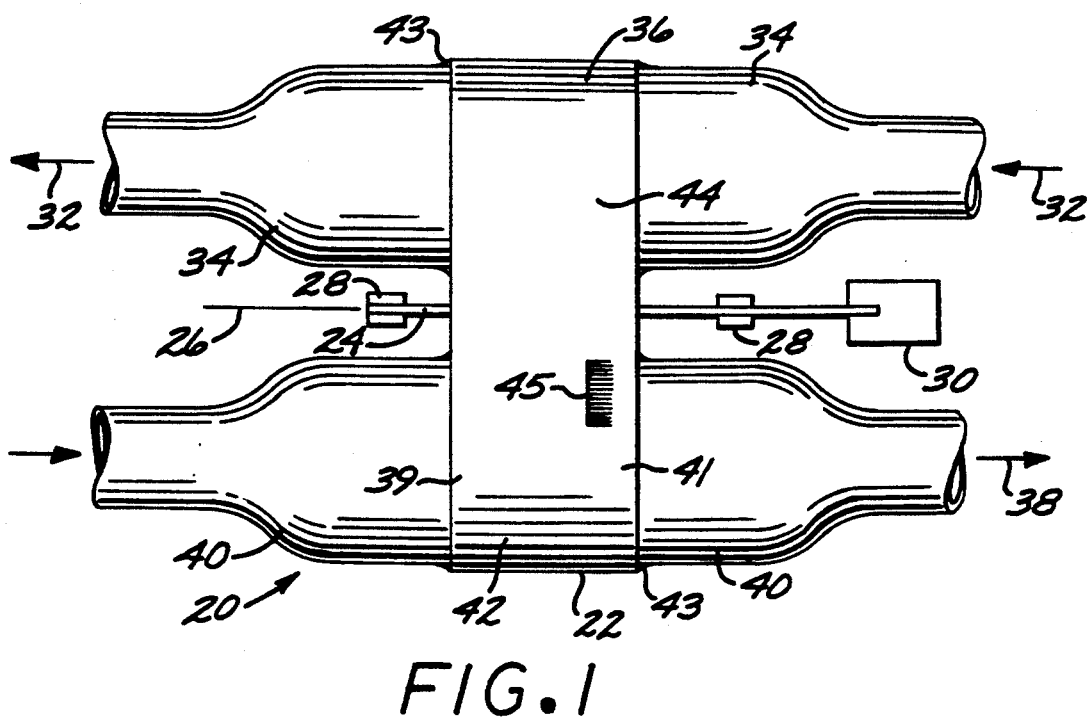
FIG. 1 is a schematic side sectional view of a rotating wheel heat exchanger system.

As shown in FIG. 1, a heat exchanger 20 used in a power plant includes a heat exchanger wheel 22 supported on a shaft 24 extending along its cylindrical axis 26. The shaft 24 and the heat exchanger wheel 22 are mounted on bearings 28 and turned by a motor 30. In a typical power plant heat exchanger 20, the heat exchanger wheel 22 is on the order of 5–65 feet in diameter and 3–8 feet thick, and turns on the shaft 24 at about 1–4 revolutions per minute.

Hot flue gas 32 flows through a hot gas plenum 34 that communicates with the heat exchanger wheel 22 over a gas side 36 of the volume of the heat exchanger wheel 22. The hot gas plenum 34 extends and delivers combustion (flue) gas over only a portion of the face of the heat exchanger wheel 22, the gas side 36. The hot flue gas 32 flows through the gas side 36 of the heat exchanger wheel 22. The continuation of the hot gas plenum 34 collects the flue gas 32 leaving the heat exchanger wheel 22 for passage to downstream pollution control equipment and eventually to an exhaust stack. The flue gas 32 is cooled by its passage through the heat exchanger wheel 22.

Cool incoming air 38 flows through an air plenum 40 that communicates with the heat exchanger wheel 22 over an air side 42 of the volume of the heat exchanger wheel 22. The air plenum 40 extends over and delivers air to only a second portion of the face of the heat exchanger wheel 22, the air side 42. The cool air 38 enters the heat exchanger wheel 22 at a cool end 39, flows through the air side 42 of the heat exchanger wheel 22, and leaves the heat exchanger wheel 22 at a hot end 41. The continuation of the air plenum 40 collects the air 38 leaving the heat exchanger wheel 22 for passage to the power plant burner or combustor. The cool air 38 is heated by its passage through the heat exchanger wheel 22.

The flows of gas are generally parallel to each other, flowing either in the same direction or, preferably, in opposite directions. In the embodiment of FIG. 1, the hot flue gas 32 and the cool air 38 pass through the heat exchanger wheel 22 in opposite directions, achieving countercurrent heat exchange. The two gas flows could be arranged to flow in the same direction, or co-currently. (As the term is used herein, "parallel" gas flows may be either countercurrent or co-current.) Seals 43 prevent the loss of gas as it flows between the plenums 34 and 40 and the heat exchanger wheel 22.

Figure 2:
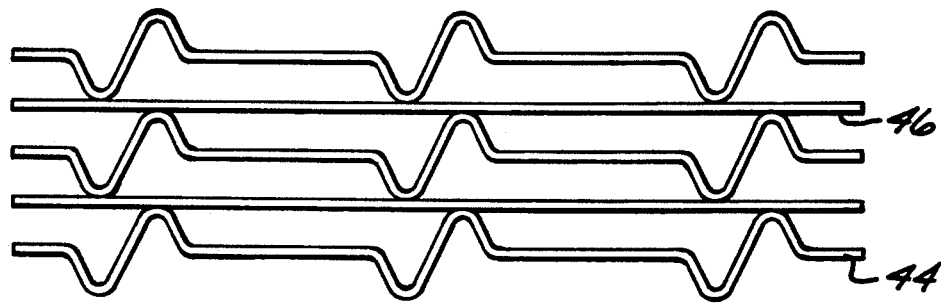
FIG. 2 is an end view of a conventional heat exchange element used in the heat exchanger of FIG. 1.

The interior volume of the heat exchanger wheel 22 contains a large number of heat exchange elements 44, often supported in baskets 45 which permit free movement of the heat exchange elements during expansion and contraction and replacement of the heat exchange elements when necessary. Such heat exchange elements 44 are typically fabricated from a metal such as steel in a plate form. An example of such a plate heat exchange element is shown in FIG. 2. The plates are not flat, but instead have a specifically formed shape that provides a large heat exchange surface area and also permits the plates to be stacked together with intermediate supports 46. There are many different configurations of plates used in heat exchange elements in the art, depending upon the particular application and portion of the heat exchanger wheel 22 in which they are placed. The configuration of FIG. 2 is intended to be illustrative, not limiting.

The gas 32 or 38 is channeled by its respective plenum 34 or 40 to flow through the interior of the heat exchanger wheel 22, to contact the heat exchange elements 44. Recalling that the heat exchanger wheel 22 is constantly turning on its shaft 24, at any moment about half of the heat exchange elements 44 are being contacted by the flow of hot gas 32, so that heat from the hot gas 32 is transferred to these heat exchange elements 44. At that same moment, the other half of the heat exchange elements 44 are being contacted by the flow of air 38, transferring accumulated heat to the flow of air. As the heat exchanger wheel 22 turns, the heat exchange elements 44 previously being heated are brought into contact with the air 38, and the heat exchange elements previously in contact with the air are brought into contact with the hot gas 32. This continuous mechanical movement results in a continuous transfer of heat from the hot gas 32 to the air 38.

Figure 6:
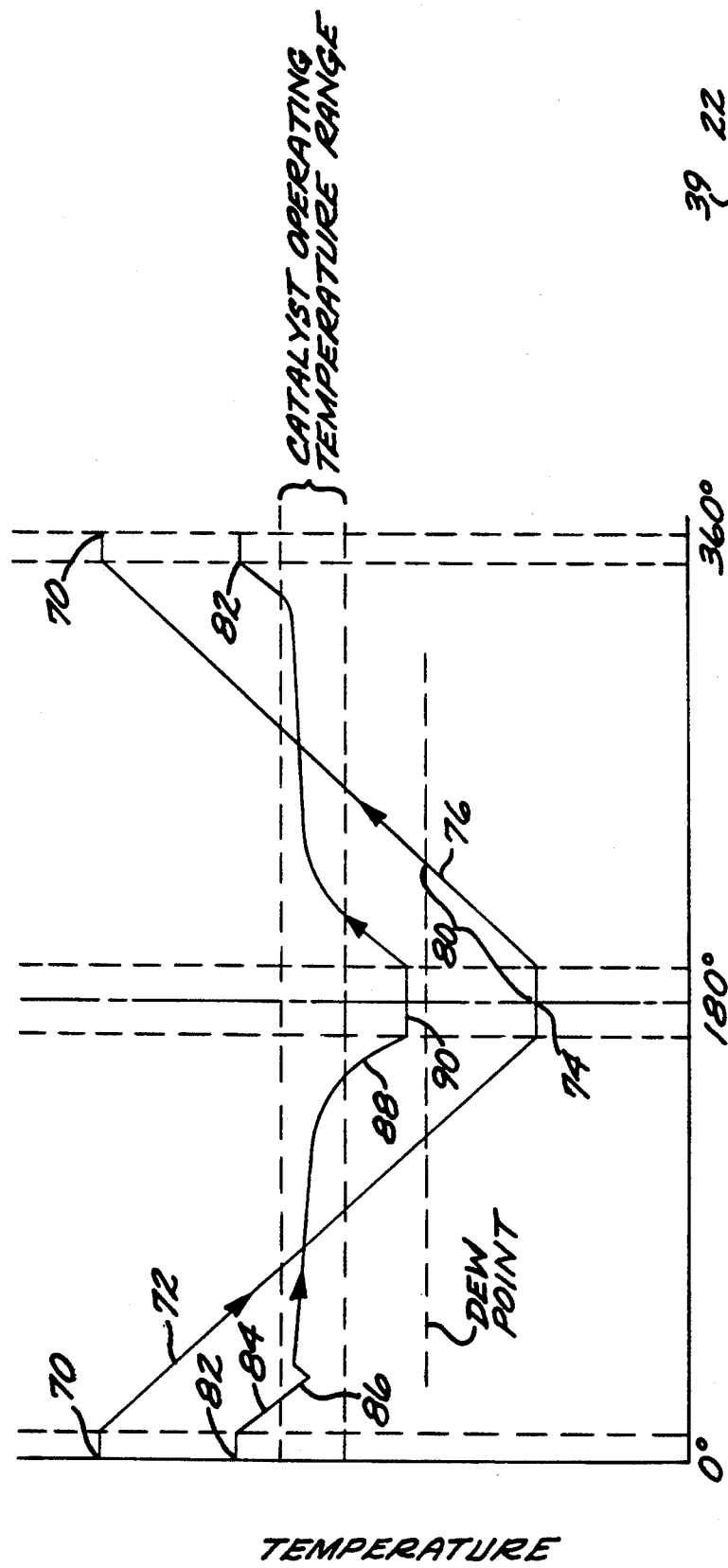
FIG. 6 are graphs of temperature as a function of time for a conventional heat exchange element and for a phase change heat exchange element in a rotating wheel heat exchanger as the wheel rotates.

FIG. 6 depicts the temperature of one of the conventional heat exchange elements 44 as a function of angular position as the heat exchanger wheel 22 rotates. Beginning from an arbitrarily selected 0 degrees, numeral 70, just as the heat exchange element 44 leaves the gas side 36 where it is contacted by the hot gas 32, the heat exchange element 44 enters the air side 42 in contact with the air 38. The temperature of the heat exchange element 44 continuously falls, numeral 72, as heat is transferred into the air 38 from the heat exchange element 44. At a position of 180 degrees, numeral 74, the heat exchange element 44 leaves the air side 42, and moves back into the hot side 36 in contact with the hot gas 32, and begins to continuously heat, numeral 76. The heat exchange element 44 eventually reaches the 0 degree position, numeral 70, and the cycle repeats. (The temperature profiles presented in FIG. 6 are idealized, and in practice may be more irregular. The idealization does not affect the analysis and conclusions.)

The hot flue gas 32 typically has a moderately high content of sulfur dioxide and sulfur trioxide, due to the burning of the fossil fuel. If the sulfur-containing gas is cooled below its dew point, a corrosive acid is condensed from the gas onto any available surfaces. In the situation depicted in FIG. 6, the heat exchange element 44 is subjected to condensation of acid from the hot flue gas 32 from the time that it reenters the gas side 36 at 180 degrees angular position, numeral 74, until the time that its temperature again exceeds the dew point, indicated by a horizontal line in FIG. 6. The heat exchange elements 44 closest to the cool end 39 are most prone to this problem, and may be corroded by the condensed acid during the period that they spend below the dew point on the gas side 36, indicated by the numeral 80. The actual value of the dew point varies with the type of fuel being burned in the combustor and its sulfur content. For example, the flue gas produced by an oil-fired burner has a dew point that varies from about 88 C. to about 113 C., and the flue gas produced by a coal-fired burner has a dew point that varies from about 68 C. to about 85 C.

A related type of problem is that in some instances it is desirable to coat the heat exchanger elements 44 in the neighborhood of the hot end 41 with a catalyst to promote a reaction in the hot gas. Such catalysts usually are operable in some defined temperature range. As depicted in FIG. 6, the temperature variations in the conventional heat exchange element are quite large, and in typical practice extend outside the operating range of the catalysts. The catalysts are therefore operable only a fraction of the time, resulting in a loss of operational efficiency.

The present invention provides an approach for increasing the minimum temperature experienced by the heat exchange element, so that it is greater than the acid condensation temperature on the cool end, and reducing the range of temperature variations experienced by the heat exchange elements, so as to lie within a catalyst operating temperature range on the hot end.

According to the present approach, a heat exchange element is formed as a hollow container filled with a material that absorbs heat at constant temperature, of an appropriate size to achieve a balance between total heat capacity of the material within the container and achieving good heat transfer into and out of the container. Several heat exchange element/container configurations are preferred, and are illustrated by way of example in FIGS. 3-5.

Figure 3:
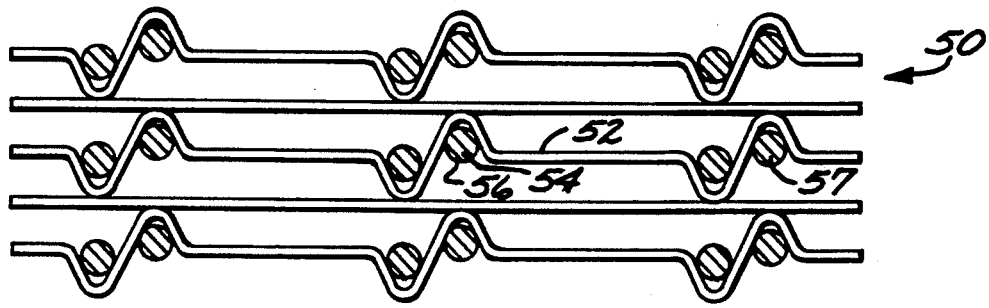
FIG. 3 is an end view of a heat exchange element incorporating a phase change material, wherein the phase change material is packaged in a container that is separable from the remainder of the heat exchange element as an integral unit.
Figure 4:
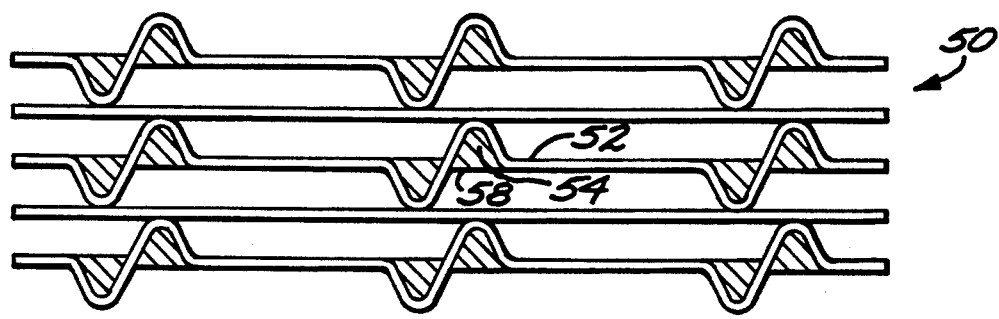
FIG. 4 is an end view of a heat exchange element incorporating a phase change material, wherein the phase change material is packaged in a container whose wall is formed in part by the remainder of the heat exchange element.
Figure 5:
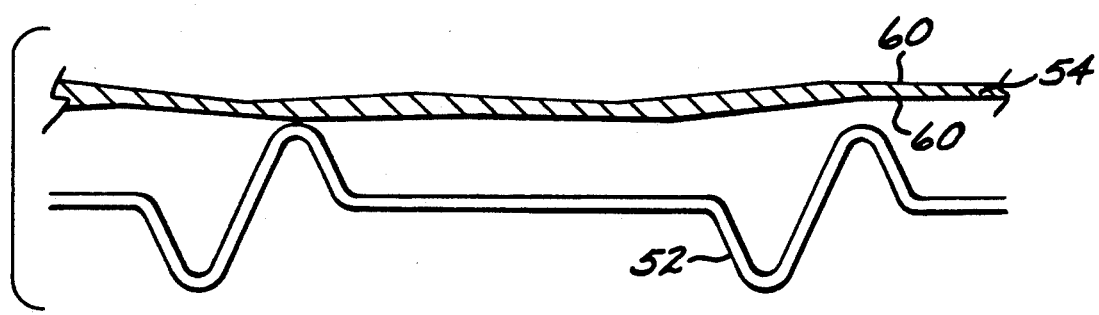
FIG. 5 is an end view of a heat exchange element incorporating a phase change material, wherein the phase change material is packaged between two sheets.

In the embodiment of FIG. 3, a heat exchange element 50 includes a plate 52 that may be similar in shape to the conventional heat exchange element 44. The heat exchange element 50 further includes a quantity of a material that absorbs heat at constant temperature, preferably a phase change material 54. The phase change material 54 is contained within a container, which may be of any operable form. As shown in FIG. 3, a container 56 is a tube in which the phase change material is sealed, forming an integral unit. In the illustrated embodiment, the tube contains internal fins 57 to increase the heat transfer rate. The container 56 is attached to the plate 52, as by welding. In the embodiment of FIG. 4, a container plate 58 is attached to the plate 52, as by welding, so that the plate 52 forms part of the wall which contains the phase change material 54. In the embodiment of FIG. 5, the phase change material 54 is sealed between two plates 60. These configurations of the heat exchange element 50 are preferred because they permit the plate 52 to be configured in a manner that has been previously determined to be useful for a particular portion of the heat exchanger wheel 22, and also to permit incorporation of the phase change material into the design. The design flexibility of the present approach permits various embodiments to be used on the same heat exchanger wheel 22.

The phase change material is a substance which absorbs heat at constant temperature as it undergoes a change in phase upon heating, and releases heat at constant temperature as it undergoes the reverse change upon cooling. The preferred phase change materials for use in the present invention are inorganic salts or eutectic mixtures of salts that undergo fusion (melting/freezing) phase changes. The phase changes occur at temperatures which are determined by the composition of the salt or the eutectic mixture of salts. Operable salts and eutectic mixtures are available over a wide temperature range. The following salts, with their approximate fusion temperatures in parenthesis, are exemplary of those that may be used for practicing the present invention, depending upon the temperature about which the stabilization is to be achieved: magnesium nitrate (hydrate) (89 C.), magnesium chloride (hydrate) (117 C.), ammonium nitrate (180 C.), sodium nitrate (300 C.), zinc chloride (310 C.), sodium hydroxide (310 C.), boron oxide (450 C.), calcium nitrate (560 C.), lithium chloride (610

C.), iron chloride (680 C.), magnesium bromide (710 C.), magnesium chloride (710 C.), potassium chloride (780 C.), calcium chloride (785 C.), sodium chloride (800 C.), lithium fluoride (840 C.), potassium fluoride (840 C.), sodium sulfate (890 C.), barium chloride (960 C.), sodium borate (1000 C.), sodium fluoride (1020 C.), sodium fluoride (1020 C.), potassium sulfate (1080 C.), magnesium phosphate (1190 C.), magnesium fluoride (1290 C.), calcium sulfate (1400 C.), and calcium fluoride (1410 C.). Examples of operable eutectic mixtures of salts and their eutectic temperatures include: 58 percent potassium fluoride, 35 percent sodium fluoride, 7 percent magnesium fluoride (685 C.); 52 percent lithium fluoride, 3.5 percent sodium fluoride, 13 percent calcium fluoride (615 C.); 65 percent sodium fluoride, 23 percent calcium fluoride, 12 percent magnesium fluoride (745 C.); 67 percent lithium fluoride, 33 percent magnesium fluoride (746 C.); 75 percent sodium fluoride, 25 percent magnesium fluoride (832 C.); 62.5 percent sodium fluoride, 22.5 percent magnesium fluoride, 15 percent potassium fluoride (809 C.); 46 percent lithium fluoride, 44 percent sodium fluoride, 10 percent magnesium fluoride (632 C.); 60 percent lithium fluoride, 40 percent sodium fluoride (652 C.); and 12 percent sodium fluoride, 40 percent potassium fluoride, 44 percent lithium fluoride, 4 percent magnesium fluoride (449 C.). The listed salts and eutectic mixtures are examples of those that may be used in the present approach, and illustrate both the broad range and narrow specificity that may be obtained. A nucleator may be added to the phase change material to promote its phase change by solidification during cooling.

It is preferred to use the phase change material so that it experiences its useful phase change in fusion rather than in vaporization. In fusion, the phase change is from solid-to-liquid on heating and liquid-to-solid on cooling. There is little volume change of the phase change material during fusion. On the other hand, in vaporization, the phase change is from liquid-to-gas on heating and gas-to-liquid on cooling. There is a large volume change of the material during vaporization, complicating the container design and increasing the possibility of loss of the phase change material. The vaporization phase change materials can also be difficult to load into their containers.

FIG. 6 also depicts the effect of utilizing the present invention in relation to a heat exchange wheel 22. Beginning from 0 degrees, numeral 82, the temperature of the heat exchange element 50 falls, numeral 84. The reduction in temperature is arrested for a period of time (and thence rotation in degrees) at the temperature of fusion, numeral 86. Heat is removed from the phase change salt into the cool air flow 38, but the phase change salt (and thence the heat exchange element 50) remains at approximately constant temperature 86. After the phase change is complete, the temperature reduction continues, numeral 88. When the turning of heat exchanger wheel 22 moves the heat exchange element back into the hot gas flow 32 at 180 degrees, numeral 90, the heat exchange element begins to reheat and follows a generally reverse path. The maximum temperature reached, numeral 82, is lower than the maximum temperature reached for the conventional heat exchange element, numeral 70, because of the presence of the phase change material that absorbs heat without permitting a temperature increase.

The use of the phase change material has important consequences. First, the temperature extremes between the highest temperature, numeral 82, and the lowest temperature, numeral 90, are smaller than the temperature extremes for the conventional heat exchange element 44, as represented by the temperature difference between numerals 70 and 74. This permits the heat exchange element to remain in a preselected narrow temperature range, such as the indicated catalyst operating temperature range, for all or most of its rotation. A catalyst coated onto the heat exchange element can therefore be effective for a greater portion of the rotation.

Second, the lowest temperature 90 reached by the heat exchange element 50 can be selected to be greater than the dew point. This maintenance of a temperature above the dew point through the entire portion of the rotational cycle in the gas side prevents condensation of acid onto the heat exchange element and consequent corrosion of the heat exchange element.

Third, the temperature of the cooled outlet flue gas flowing from the heat exchanger wheel 22 on the hot side is maintained within a more narrow temperature range with the present approach, than in the absence of the phase change material. There are smaller temperature variations experienced by the ducting and other gas management structure, as well as by downstream pollution control devices. The downstream pollution control devices such as electrostatic precipitators can be optimized at a more controllable near-constant temperature.

Fourth, it may be possible with the present approach to reduce the rate of rotation of the heat exchanger wheel. This reduction in rotational rate leads to a lower gas leakage.

The maximum temperature 82, minimum temperature 90, and resulting temperature variation of the heat exchange element 50 are determined by the selection of the phase change materials and the amounts provided in the heat exchange element. The temperature 86 of the near-constant-temperature plateau is determined by the choice of the phase change materials used. The extent of variation from these plateaus is determined by the amount of the phase change material present. For example, if a sufficiently large amount of a single phase change material were provided, the heat exchange element could be held at a single constant temperature throughout the entire heat exchange cycle. It is normally not required to maintain a constant temperature, and is uneconomical because of the large amount of the phase change material that is required and the potential adverse effect on heat transfer rates. In normal practice, the amount of phase change material is selected to be sufficient to meet the desired temperature limitations, including in most cases maintaining the heat exchange element above the acid condensation temperature and in other cases maintaining the heat exchange element within a preselected temperature range. Increasing the sensible heat capacity of the heat exchange elements is not the motivation for the present invention, and any increase in heat capacity is incidental.

In most instances, the present approach is not used to attempt to stabilize the temperature throughout the entire volume of the heat exchanger wheel to some constant temperature. In fact, it may be more desirable that the cool end of the heat exchanger wheel is stabilized to some narrow range of temperature, and the hot end of the heat exchanger wheel is stabilized to some other narrow range of temperature. Although the graph of FIG. 6 indicates that a single phase change material can be used to maintain the heat exchange elements simultaneously within a catalyst operating temperature range and above the acid dew point, in most cases this would require an excessively large amount of the phase change material and may not be desirable in any event.

Figure 7:
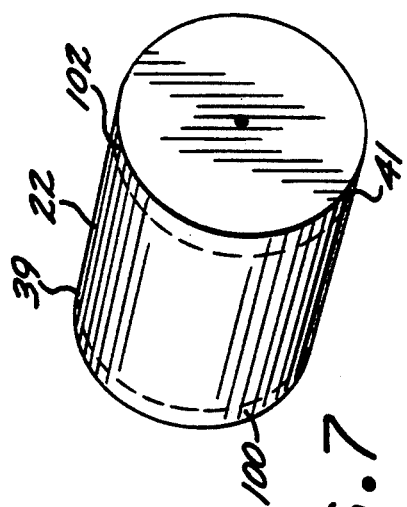
FIG. 7 is a perspective view of a heat exchanger wheel.

Instead, the temperature is stabilized in sections perpendicular to the axis of rotation 26, to achieve a more uniform temperature during each angular revolution of the heat exchanger wheel 22 in that section. FIG. 7 shows the heat exchanger wheel 22 in perspective, with a section 100 at the cool end 39 and another section 102 at the hot end 41. A low-temperature phase change material would be used in the heat exchange elements 50 placed into the section 100 at the cool end 39. A different, high-temperature phase change material would be used in the heat exchange elements 50 placed into the section 102 at the hot end 41. This arrangement permits the temperature to be stabilized at the cool end to be above the acid dew point with a relatively modest amount of the low-temperature phase change material, and to be stabilized at the hot end to be within the catalyst operating temperature range with a relatively modest amount of the high-temperature phase change material.

The present invention provides a temperature-stabilized heat exchanger that overcomes problems commonly found in conventional designs. Although a particular embodiment of the invention has been described in detail for purposes of illustration, various modifications may be made without departing from the spirit and scope of the invention. Accordingly, the invention is not to be limited except as by the appended claims.

What is claimed is:

1. In a heat exchange module wherein a plurality of such modules are positioned in a known manner in a regenerative heat exchanger having portions thereof rotatable about a central axis, the improvement comprising:
    said modules having a plurality of catalyst-coated heat exchange elements therein located in a layer at an axial location along the central axis, each of said catalyst-coated heat exchange elements being coated with a catalyst;
    at least some of said catalyst-coated heat exchange elements including encapsulated hollow sections carried adjacent respective surfaces thereof; and
    said hollow sections each being filled with a suitable phase change material which absorbs and releases heat from the fluid passing through such a regenerative heat exchanger, without a substantial change in temperature during the phase change of such material, the phase change material serving to stabilize the temperature of the catalyst-coated heat exchange elements to within a preselected operating range of the catalyst, which temperature range is substantially within the optimal operational range of the catalyst.

2. The heat exchange module of claim 1, wherein the heat exchange elements are supported in baskets.

3. The heat exchange module of claim 1, wherein the phase change material comprises a material selected from the group consisting of a salt and a mixture of salts.

4. The heat exchange module of claim 1, wherein at least some of the heat exchange elements comprise a support plate and a container of the phase change material on the support plate.

5. The heat exchange module of claim 4, wherein the container is separable from the support plate as an integral unit.

6. The heat exchange module of claim 4, wherein a wall of the container is formed by the support plate.

7. The heat exchange module of claim 4, wherein the container has internal fins.

8. The heat exchange module of claim 4, wherein the container is made of a material selected from the group consisting of a metal, a ceramic, and a plastic.

9. The heat exchange module of claim 4, wherein the support plate is made of a material selected from the group consisting of a metal, a ceramic, and a plastic.

10. In a regenerative heat exchanger having portions thereof rotatable about a central axis and which includes a plurality of heat exchange modules positioned therein, the improvement comprising:
    at least some of said modules having a plurality of catalyst-coated heat exchange elements therein located in a layer at an axial location along the central axis, each of said catalyst-coated heat exchange elements being coated with a catalyst;
    at least some of said catalyst-coated heat exchange elements including encapsulated hollow sections carried adjacent respective surfaces thereof; and
    said hollow sections each being filled with a suitable phase change material which absorbs and releases heat from a fluid passing through said regenerative heat exchanger, without a substantial change in temperature during the phase change of such material, the pass change material serving to stabilize the temperature of the catalyst-coated heat exchange elements to within a preselected operating temperature range of the catalyst, which temperature range is substantially within the optimal operational range of the catalyst.

11. The heat exchanger of claim 10, wherein the heat exchange elements are supported in baskets.

12. The heat exchanger of claim 10, wherein the phase change material comprises a material selected from the group consisting of a salt and a mixture of salts.

13. The heat exchanger of claim 10, wherein at least some of the heat exchange elements comprise a support plate and a container of the phase change material supported on the support plate.

14. The heat exchanger of claim 13, wherein the container is separable from the support plate as an integral unit.

15. The heat exchanger of claim 13, wherein a wall of the container is formed by the support plate.

16. The heat exchanger of claim 13, wherein the container is made of a material selected from the group consisting of a metal, a ceramic, and a plastic.

17. The heat exchanger of claim 13, wherein the support plate is made of a material selected from the group consisting of a metal, a ceramic, and a plastic.

18. The heat exchanger of claim 13, wherein the container has internal fins.

19. A heat exchanger having a central axis about which a plurality of heat exchange elements rotate, the heat exchanger comprising:
    a plurality of cold-end heat exchange modules located in a cold-end layer along the central axis at a cold end of the heat exchanger, the cold-end heat exchange modules rotating from a first region where they contact flue gas to a second region where they contact air as the heat exchanger wheel rotates about its central axis;
    a plurality of cold-end heat exchange elements within each of the cold-end heat exchanger modules;

means for stabilizing the temperature of said cold-end heat exchange elements to be greater than a preselected flue gas compound condensation temperature as the heat exchanger modules pass through the first region, said means including encapsulated hollow sections carried adjacent to respective surfaces of the cold-end heat exchange elements, said hollow sections each being filled with a suitable phase change material which absorbs and releases heat from a fluid passing through said regenerative heat exchanger, without a substantial change in temperature during the phase change of such material at a phase change temperature greater than the compound condensation temperature.

20. The heat exchanger of claim 19, further including: a plurality of other heat exchange elements not located in the cold-end layer of the heat exchanger, said other heat exchange elements not having hollow sections containing said phase change material.

21. A regenerative heat exchanger having portions thereof rotatable about a central axis comprising: a plurality of heat exchange modules located in a layer at an axial location along the central axis of the heat exchanger, said heat exchange modules periodically contacting flue gas in the first region and air in the second region;

said modules having a plurality of heat exchange elements therein;

each of said heat exchange elements being coated with a catalyst; and means for stabilizing the temperature of said catalyzed heat exchange elements to be within the optimal operating temperature range of the catalyst, said means including encapsulated hollow sections carried adjacent to respective surfaces of the catalyzed heat exchange elements, said hollow sections each being filled with a suitable phase changing material which absorbs and releases heat from a fluid passing through said regenerative heat exchanger, without a substantial change in temperature during the phase change of such material, at a phase change temperature within the optimal operating temperature range of the catalyst.

* * * * *